United States Patent [19]
Diamant

[11] Patent Number: 5,574,508
[45] Date of Patent: Nov. 12, 1996

[54] VERTICAL PANNING FOR INTERLACED VIDEO

[75] Inventor: Robert K. Diamant, Zurich, Switzerland

[73] Assignee: RCA Thomson Licensing Corporation, Princeton, N.J.

[21] Appl. No.: 333,181

[22] Filed: Nov. 2, 1994

[51] Int. Cl.$^6$ ........................................ H04N 5/04
[52] U.S. Cl. ............................ 348/511; 348/578
[58] Field of Search .................... 348/511, 578, 348/580, 571, 722, 739; 345/124, 123; H04N 5/04

[56] References Cited

U.S. PATENT DOCUMENTS

| | | | |
|---|---|---|---|
| 3,793,483 | 2/1974 | Bushnell | 348/511 |
| 3,827,041 | 7/1974 | Cook | 345/124 X |
| 4,706,075 | 11/1987 | Hattori et al. | 345/124 |
| 5,021,772 | 6/1991 | King et al. | 345/123 X |
| 5,262,864 | 11/1993 | Saeger et al. | 358/180 |
| 5,345,152 | 9/1994 | Wilber | 315/371 |

OTHER PUBLICATIONS

*PLDshell Plus/PLDasm User's Guide*, V2.1, pp. 7–33 thru 7–36 and F–1 thru F–8, for the 5C060, Intel.
*CD 4046BM/CD4046BC Micropower Phase–Locked Loop*, National Semiconductor, pp. 5–141, 5–146, 5–148.

Instruction Manual for Type: TVM 3/51 Monochrome Monitor from Barco Video Systems.

*Primary Examiner*—Victor R. Kostak
*Attorney, Agent, or Firm*—Joseph S. Tripoli; Joseph J. Laks; Harvey D. Fried

[57] ABSTRACT

A vertical panning system comprises: a source of respective signals having a vertical synchronizing frequency, a horizontal synchronizing frequency and a multiple of the horizontal synchronizing frequency; a video display having an interlaced field mode of operation; a horizontal display control circuit coupled to the video display and responsive to the supplied horizontal synchronizing frequency signal; a digital phase delay circuit, responsive to the supplied multiple horizontal synchronizing frequency signal, the supplied vertical synchronizing frequency signal and to a panning control signal, having as an output a second vertical synchronizing frequency signal delayed in phase relative to the supplied vertical synchronizing frequency signal by any one of a plurality of delays differing in increments corresponding in duration to horizontal half line intervals; and, a vertical display control circuit coupled to the video display and responsive to the second vertical synchronizing frequency signal.

11 Claims, 4 Drawing Sheets

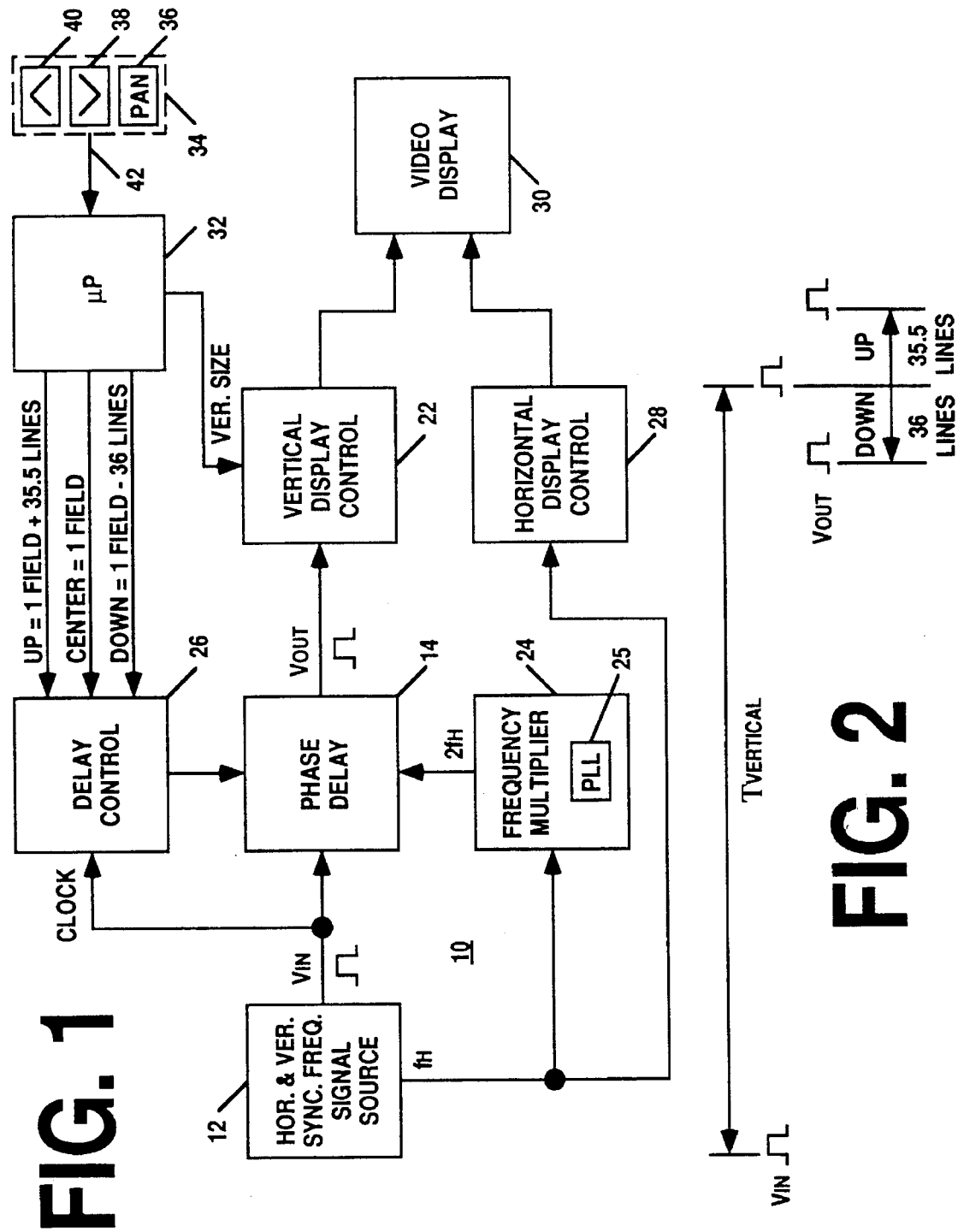

VERTICAL PANNING FOR INTERLACED VIDEO

BACKGROUND OF THE INVENTION

1. Field of the Invention

This invention relates to the field of vertically panning pictures in television receivers, and in particular, to vertically panning enlarged pictures from conventional source material in wide screen television receivers, and the like.

2. Description Of Related Art

The ratio of the width to the height of the borders of a picture or the borders of a display screen for a picture are referred to herein as the format display ratio. The ratio of the width to the height of images forming a picture is referred to herein as the image aspect ratio. A mismatch of format display ratios which results in distorted images in a picture is referred to herein as image aspect ratio distortion.

Conventional source material having pictures with a format display ratio of 4×3, for example, cannot be displayed on a wide screen television receiver with a format display ratio of 16×9, for example, unless the video signal is speeded up. For these format display ratios, for example, the video signal must be speeded up by a factor of 4/3. This results in 1/4 of the display screen being blank, which can be deemed by viewers as an undesirable operating condition, in which the wide feature of the television receiver is wasted.

An alternative to speeding up the video signal is to vertically enlarge the picture. This can be accomplished by manipulating the vertical deflection height or by vertical interpolation of the video signal. If the vertical height of a picture having a 4×3 format display ratio is increased by a factor of 4/3 on a wide screen display having a format display ratio of 16×9, without speeding up the video signal, then the picture will have no image aspect ratio distortion as displayed, and in fact, the picture, as defined by each image of the picture, will be larger in size. Moreover, the screen will be completely filled by a picture. However, 1/4 of the picture will be missing. If the picture happens to be centered as enlarged, or zoomed, then the top 1/8 and bottom 1/8 will be cropped, that is, missing. This cropping presents no problem if the picture is also in letterbox format, wherein approximately the top 1/8 and approximately the bottom 1/8 of the picture are dark bars having no information content. In fact, this is a very desirable display mode for a wide screen receiver.

However, if the source picture is not in letterbox format, then 1/4 of the picture content will be missing. The center of action may very well be cropped. Under these circumstances, it is desirable to vertically pan the zoomed picture, as necessary, to follow the center of the action. A vertical panning capacity enables viewer choice as to which part of the zoomed picture will be shown and which part will be cropped. Vertical panning can also be implemented responsive to a panning control signal transmitted with the video signal, for example, which requires an appropriate decoder in the receiver.

A first analog approach for vertically positioning a picture is superimposing a DC component on the vertical deflection current. This requires a DC coupled vertical deflection amplifier and sufficient output current range. Disadvantageously, such an amplifier suffers increased dissipation losses.

A second analog approach uses a floating DC current source coupled in parallel with the vertical deflection yoke. The dynamic range of the output voltage of the current source must be large enough to account for the flyback pulse.

A serious problem with all approaches using current superposition is that the vertical S-correction and the East-West-correction must be automatically adjusted over the entire range of the vertical shift.

A third analog approach adapted for use with horizontal deflection systems operating with interlaced fields at $f_H$, designating the basic horizontal synchronizing frequency, provides for phase shifting of the vertical deflection with respect to the video signal using analog pulse delaying techniques. In one such known circuit three one-shot multivibrators are connected in series, and provide respective pulses having durations of T1, T2 and T3 respectively. A vertical drive output pulse is an input to the first one-shot. The first two one-shots generate a total delay time of T1+T2. The output of the third one-shot is a delayed vertical drive output pulse having a duration T3. A shift control input signal can be used to vary the duration of T2, the output pulse of the second one-shot, between a minimum value and a maximum value. This results in shifting the picture downwardly and upwardly respectively. Such analog circuits have serious problems, causing incorrect interlacing and jitter.

Vertical panning circuits utilizing digital techniques have been developed for use with horizontal deflection systems operating with non interlaced fields at $2f_H$, that is, twice a basic horizontal synchronizing frequency $f_H$.

In a first digital approach, a panning control circuit adjusts a vertical blanking interval in phase relative to the vertical synchronizing component to control which portion of the enlarged picture area is displayed and which portion is not displayed. This system requires a DC coupled vertical deflection system in order to function properly. As a result of the DC coupling, implementation of a vertical zoom results in the bottom part of the picture being cropped, absent any vertical panning. Some vertical panning is required in order to center the picture, which is usually deemed necessary as a starting point for a vertical zoom display mode.

A circuit for automatically adjusting S-correction which can be used with the first digital approach described above can utilize a differential amplifier formed by a pair of transistors, which couple a vertical sawtooth signal to an input side of a vertical deflection amplifier. Nonlinearity of the transistor pair provides linearity or S-correction in the vertical direction. The amplitude of the sawtooth signal is adjusted by adjusting a vertical height control signal. The vertical height control signal is coupled to the emitters of the transistor pair for controlling the nonlinearity, in order to compensate for the change in the S-correction requirement introduced by the amplitude adjustment.

In a second digital approach, referred to as a frame based vertical panning system, the panning control circuit counts the horizontal lines, or half lines, and generates a vertical reset signal delayed by a variable pan delay relative to the vertical synchronizing component of the video signal. The pan delay can vary in mutually exclusive ranges to control interline flicker of the panned video signal when successive fields have different numbers of horizontal lines, such as during the pause mode of VCR playback wherein the number of lines per field varies as a function of tape speed and recording mode.

In a third digital approach, referred to as a field to field vertical panning system, is based on a video signal having a standard field length and having a vertical synchronizing component dividing groups of successive horizontal lines into successive fields. The panning control circuit measures a variance between the actual length of each successive field and the standard length. A vertical reset signal is delayed by a pan delay relative to the vertical synchronizing component of the video signal. The pan delay can be adjusted on a field by field basis responsive to the field length variance, if any, to control interline flicker of the panned video signal when the fields have nonstandard field lengths.

A clear need is established for a vertical panning circuit which is can be used with a television receiver which operates at $f_H$, which does not cause interlacing problems, which can be used with both AC and DC coupled vertical deflection systems, which does not have increased dissipation losses and which does not require continuous readjustment of S-correction and East-West-correction during vertical panning.

SUMMARY OF THE INVENTION

A vertical panning system which solves the problems identified in the prior art may be thought of as comprising: means for supplying respective signals having a vertical synchronizing frequency, a horizontal synchronizing frequency and a multiple of the horizontal synchronizing frequency; a horizontal display control circuit for a video display, responsive to the supplied horizontal synchronizing frequency signal for displaying a video signal by interlacing fields; digital means responsive to the supplied multiple horizontal synchronizing frequency signal, the supplied vertical synchronizing frequency signal and to a panning control signal for generating a second vertical synchronizing frequency signal delayed in phase relative to the supplied vertical synchronizing frequency signal by any one of a plurality of delays differing in increments corresponding in duration to horizontal half line intervals; and, a vertical display control circuit for the video display, responsive to the second vertical synchronizing frequency signal. The means for generating the second vertical synchronizing signal may be thought of as comprising: first digital counting means for generating a first clock output signal, clocked by the multiple horizontal frequency signal and enabled by the vertical frequency signal; second digital counting means for generating a second clock output signal, clocked by the multiple horizontal frequency signal and set by the first output signal; third digital counting means, clocked by the vertical frequency signal, for generating a third clock output signal for presetting the second counter, the third clock output signal varying responsive to the panning control signal; and, digital decoding means responsive to the second clock output signal for generating the phase delayed vertical frequency synchronizing signal.

Alternatively, a vertical panning system which solves the problems identified in the prior art may also be thought of as comprising: a source of respective signals having a vertical synchronizing frequency, a horizontal synchronizing frequency and a multiple of the horizontal synchronizing frequency; a video display having a mode of operation in which fields of an input video signal are displayed in an interlaced format; a horizontal display control circuit coupled to the video display and responsive to the supplied horizontal synchronizing frequency signal; a digital phase delay circuit, responsive to the supplied multiple horizontal synchronizing frequency signal, the supplied vertical synchronizing frequency signal and to a panning control signal, having as an output a second vertical synchronizing frequency signal delayed in phase relative to the supplied vertical synchronizing frequency signal by any one of a plurality of delays differing in increments corresponding in duration to horizontal half line intervals; and, a vertical display control circuit coupled to the video display and responsive to the second vertical synchronizing frequency signal. The digital phase delay circuit may be thought of as comprising: a first counter, clocked by the multiple horizontal synchronizing signal, enabled by the vertical synchronizing signal and generating a first clock output signal; a second counter, clocked by the multiple horizontal synchronizing signal, set by the first clock output signal to a starting count and generating a second clock output signal; a third counter, clocked by the vertical synchronizing signal and generating a third clock output signal coupled to the second counter as the starting count, the third clock output signal varying responsive to vertical panning control signals; and, a decoder coupled for receiving the second clock output signal and generating a decoded output signal as the phase delayed vertical frequency synchronizing signal.

In each of the foregoing alternatives, the horizontal synchronizing frequency may correspond to a horizontal synchronizing signal of an input video signal, for example $f_H$, and the multiple of the horizontal synchronizing frequency is twice that of the horizontal synchronizing signal of the input video signal, for example, $2f_H$.

It will be appreciated that various inventive arrangements may be characterized in numerous alternative formulations, including but not limited to those set forth above, utilizing differing levels of structural and functional descriptions.

BRIEF DESCRIPTION OF THE DRAWINGS

FIG. 1 is a block diagram of a vertical panning circuit according to an inventive arrangement.

FIG. 2 is a timing diagram useful for explaining the operation of the circuit shown in FIG. 1.

DETAILED DESCRIPTION OF THE PREFERRED EMBODIMENT

Figure 3:
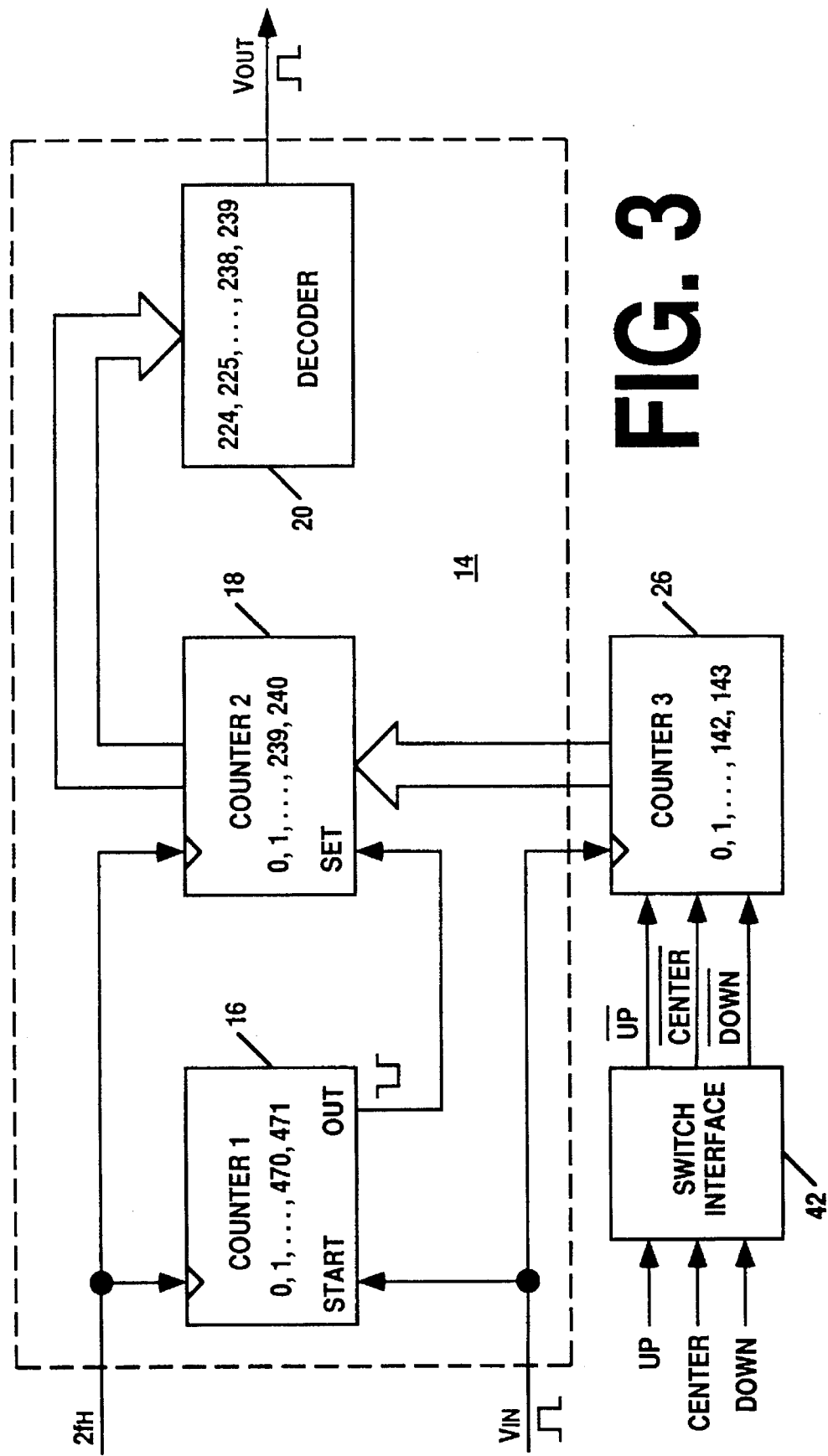
FIG. 3 is a block diagram of an embodiment for implementing the phase delay circuit shown in FIG. 1.

A block diagram of a vertical panning circuit according to an inventive arrangement is shown in FIG. 1 and generally denoted by reference numeral 10. Panning circuit 10 delays the vertical synchronizing signal in phase, for example at the point at which vertical drive pulses are generated, by an integer multiple of half of the period of the horizontal scanning frequency, denoted herein as $f_H$. The amount of the phase delay is adjustable in increments of half the line scan period, in the range of from one field time interval plus 35.5 horizontal line periods to one field time interval minus 36 horizontal line periods. This range results in a maximum vertical shift of the picture of 35.5 lines up from the center position and 36 lines down from the center position. Advantageously, due to the implementation of the adjustable time delay in integral multiples of half of the horizontal scan period, the interlacing is correct and inherently stable. Moreover, the circuit lends itself to be implemented in the kind of integrated circuits now used for generating vertical drive pulses by the countdown method.

Block 12 represents a source of respective signals having horizontal and vertical synchronizing frequencies, which may be the horizontal and vertical synchronizing signals of an input composite video signal as provided, for example, by a synchronizing signal separating circuit. Alternatively, the respective signals may be derived from the horizontal and vertical synchronizing signals of an input composite video signal, for example being the respective horizontal and vertical output drive signals.

An output signal of block 12 having a vertical synchronizing frequency is denoted $V_{IN}$. Signal $V_{IN}$ is an input to phase delay block 14 and delay control block 26. An output signal of block 12 having a horizontal synchronizing frequency is denoted $f_H$. Signal $f_H$ is an input to a frequency multiplier block 24 and a horizontal display control block 28. The $V_{IN}$ and $f_H$ signals are in a synchronous relationship with the vertical and horizontal synchronizing signals, respectively, of the input video signal.

Block 24 represents a frequency multiplier, which in this embodiment, generates a $2f_H$ signal as an output. Frequency multipliers are well known, and usually incorporate a phase locked loop, such as PLL 25, to assure that the $2f_H$ output signal remains synchronized with the $f_H$ input signal. It is desirable that the $2f_H$ signal be substantially symmetric with the period of the $f_H$ signal to avoid a situation in which the even fields and the odd fields are not laterally aligned with one another as displayed. The $2f_H$ signal need not be generated if the $2f_H$ signal is otherwise available in the receiver.

Block 14 represents a phase delay circuit which generates a second vertical synchronizing frequency signal $V_{OUT}$ as an output signal. Signal $V_{OUT}$ is delayed in phase relative to signal $V_{IN}$. In accordance with an inventive arrangement, the signal VOUT is delayed in phase by any one of a plurality of phase delays differing in time increments. Each of the increments corresponds in duration to half line intervals. Each half line interval corresponds to each period of the multiple horizontal frequency signal, for example the $2f_H$ signal in this embodiment. The multiple horizontal frequency signal provides a timing base for the phase delay circuit 14 which makes half line interval phase delay increments possible. The signal $V_{IN}$ assures that the phase delayed VOUT signal remains synchronized with the input video signal.

Block 26 represents a delay control circuit. The delay control circuit generates an output signal which adjusts the number of incremental delays applied to the $V_{IN}$ signal in the phase delay circuit 14. The $V_{IN}$ signal provides a clock source to assure that the delay control circuit 26 is properly synchronized with the phase delay 5 circuit 14.

Block 32 represents a microprocessor, µP 32. The microprocessor provides up, center and down commands to the delay control circuit 26. The microprocessor responds to viewer commands, as may be generated by a keypad, a portion 34 of which includes a PAN button 36, a DOWN button 38 and an UP button 40. The keypad is coupled to the microprocessor by a link 42, which may be, for example, a wiring harness or an infra red link of a remote control. The keypad portion 34 illustrates one of numerous control schemes, wherein for example, UP and DOWN volume control buttons can be used to generate up and down panning commands if the PAN button is simultaneously pressed.

The CENTER command sets a delay of one field time interval, which results in the picture being vertically centered. This corresponds to each pulse of the signal $V_{OUT}$ occurring one vertical period $T_{VERTICAL}$ after each pulse of the signal $V_{IN}$, as shown in FIG. 2. The UP command sets a delay in the range of one field time interval plus 0.5 to 35.5 line periods. The DOWN command sets a delay in the range of one field time interval minus 0.5 to 36 line periods.

Referring back to FIG. 1, block 22 represents a vertical display control circuit, having the phase delay adjusted $V_{OUT}$ signal as an input. The vertical display control circuit may be a vertical deflection circuit adapted for use with a cathode ray picture tube or a raster mapping circuit adapted for use with a liquid crystal or plasma display. In any adaptation, the vertical display control circuit receives a vertical size control signal from microprocessor 32, which controls the vertical size of the picture. Vertical panning is necessitated by the vertical zoom feature found, for example, in many wide screen television receivers. In a deflection system, the vertical height of a picture can be adjusted by changing the slope of the vertical deflection current. Such circuits are now well known. A raster mapping circuit changes the vertical addresses for the horizontal lines, and may create intermediate horizontal lines by interpolation. Such circuits are also well known.

Block 28 represents a horizontal display control circuit, having the $f_H$ signal as an input. The horizontal display control circuit may be a horizontal deflection circuit adapted for use with a cathode ray picture tube or a raster mapping circuit adapted for use with a liquid crystal or plasma display. Vertically zooming a 4×3 format display ratio picture on a wide screen display does not require adjustment of the horizontal scan width.

Horizontal and vertical display control signals generated by the horizontal and vertical display control circuits, respectively, are inputs to a video display, represented by block 30. The video display 30 has a wide format display ratio, for example 16×9, so as to be appropriate for implementing a vertical zoom feature. The video display 30 may be a cathode ray picture tube, a liquid crystal display, a plasma display or any other suitable arrangement for displaying a picture represented by a video signal.

FIG. 3 is a detailed block diagram of the phase delay circuit 14. The phase delay circuit 14 may be embodied as two synchronous digital counters and a decoder. A first counter 16, also denoted COUNTER 1, is a 9-bit binary counter. The first counter is clocked by the $2f_H$ signal and starts counting, at the $2f_H$ rate, responsive to the $V_{IN}$ signal. A second counter, also denoted COUNTER 2, 18 is an 8-bit programmable counter. The second counter is also clocked by the $2f_H$ signal and is set by a predetermined output count of the first counter. The output count of the second counter is an input to a 4-bit digital decoder 20. The decoded output signal of decoder 20 is the phase delayed vertical synchronizing signal VOUT. The delay control circuit 26 is embodied as a third digital counter 26, also denoted COUNTER 3. The third counter is a synchronous 8-bit programmable binary up/down counter, clocked by the signal VIN. The output count of the third counter 26 provides the preset count value for the second counter 18.

Block 42 represents a switch interface, which is illustrative of one manner in which the microprocessor 32 can translate a viewer generated vertical panning control signal into an appropriate digital to panning control signal.

Counter 16 is reset to zero when the vertical frequency synchronizing signal $V_{IN}$ is logically HIGH and starts counting at the $2f_H$ clock rate. The OUT output is a logical HIGH. When the count reaches "470", the OUT output goes to a logical LOW. At the next $2f_H$ clock pulse, counter 18 is preloaded with an output count value from counter 26 in the range of "0" through "143". Counter 16 stops counting at a termination count of "471".

Counter 18 starts counting from the preloaded value and advances until it stops counting at its termination count of "240". The four most significant bits of the output count of counter 18 are supplied to the 4-bit decoder 20. The phase delayed signal $V_{OUT}$ has delayed vertical synchronizing pulses with a duration of 16 counts, for the count range of "224" through "239".

Vertical panning control signals UP, CENTER and DOWN to counter 26 are used to modify the preload value supplied by counter 26 to counter 18. A logical LOW signal, for example, to different ones of the control inputs of counter 26 will cause counter 26 to increment, decrement or set to a predetermined value. The total delay in phase between the $V_{IN}$ and $V_{OUT}$ signals is the sum of the counting periods of counters 16 and 18. In the PAL system, where the vertical pulse frequency is 50 Hz, approximately 2.8 second is needed to shift the picture across the entire available range.

The total pulse delay time is adjustable form one field plus 71 counts to one field minus 72 counts. This corresponds to shifting the picture in the vertical direction from 35.5 lines above the center position to 36 lines below the center position.

The absolute vertical shift would be greater in the NTSC system because there are fewer horizontal lines per video field. Accordingly, a vertical panning system adapted for use with NTSC signals might require a different panning range, as measured in terms of the number of incremental half line intervals.

It is possible that some jitter may occur during special VCR modes, such as fast forward or reverse search, when successive fields may not have the same number of lines. This occasional condition is believed to be of little or no practical consequence, in view of the many advantages presented by the inventive arrangements.

Figure 4:
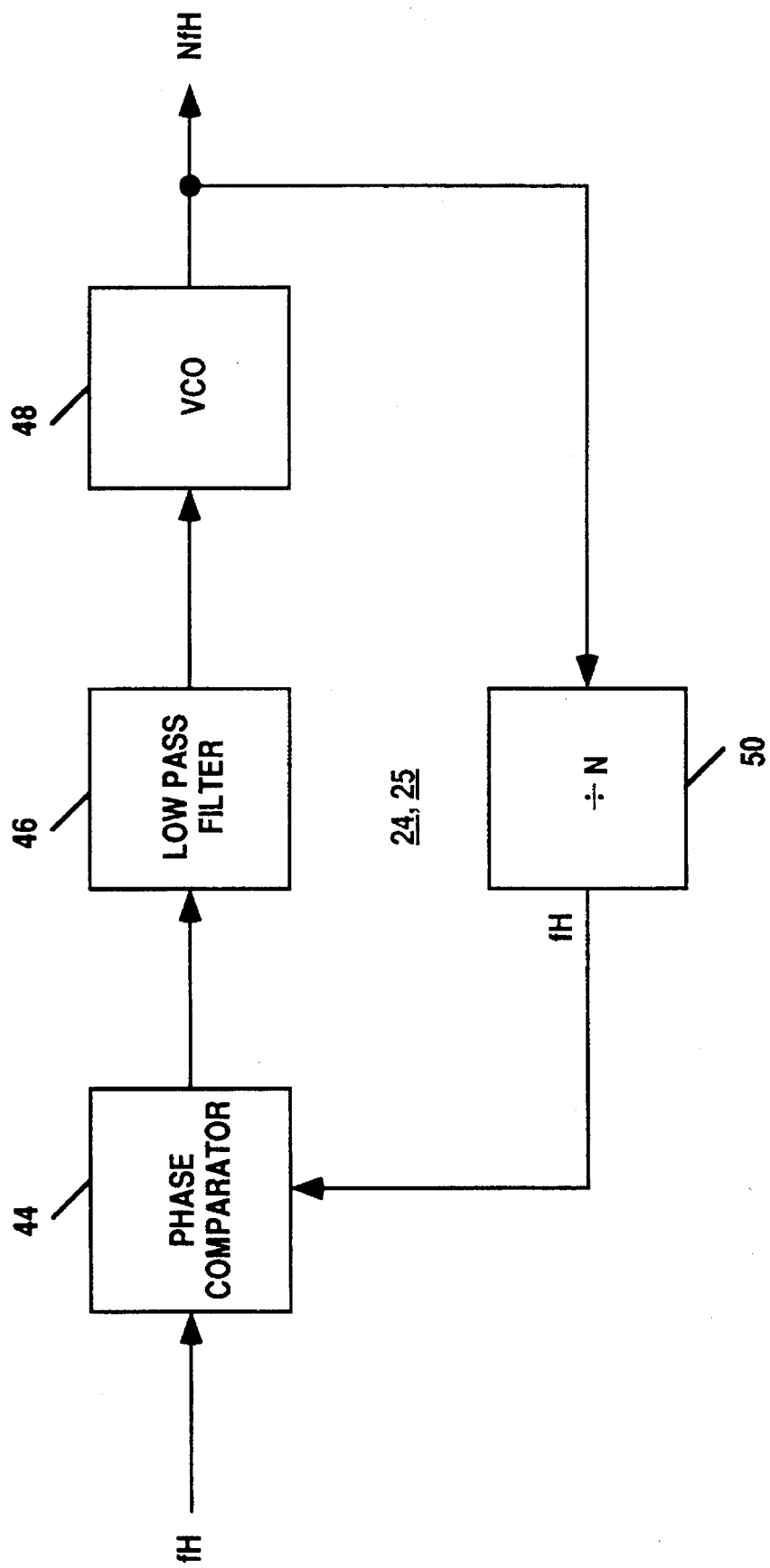
FIG. 4 is a block diagram of an embodiment for implementing the frequency multiplier and phase locked loop shown in FIG. 1.

FIG. 4 is a block diagram of a frequency multiplier including a phase locked loop. Block 44 represents a phase comparator which receives an $f_H$ synchronizing signal as a first input. An output of the phase comparator is an input to a low pass filter represented by block 46. The output of the low pass filter 46 is a control voltage input for a voltage controlled oscillator represented by block 48. The oscillator has a nominal operating frequency of $Nf_H$, where N is an integer. The output $Nf_H$ signal of the voltage controlled oscillator can be used, for example, as a clock signal for phase delay circuit 14. In the embodiment of FIG. 3, the $Nf_H$ signal is the clock signal for the first and second counters 16 and 18. The $Nf_H$ signal is also an input to a÷N circuit represented by block 50. Block 50 provides a second $f_H$ signal as a second input to phase comparator 44, which closes the phase locked loop. The output of phase comparator 44 represents the phase difference between the two $f_H$ signals, and increases or decreases the frequency of the voltage controlled oscillator, as necessary, to assure that the $Nf_H$ signal generated by the oscillator remains locked in phase with the input $f_H$ signal. The phase locked loop, and its constituent circuit parts, can be implemented as an analog circuit, a digital circuit or a hybrid of analog and digital components. The oscillator and phase locked loop may also be embodied in one or more integrated circuits. In the illustrated embodiments, the integer N is equal to 2.

Figure 5:
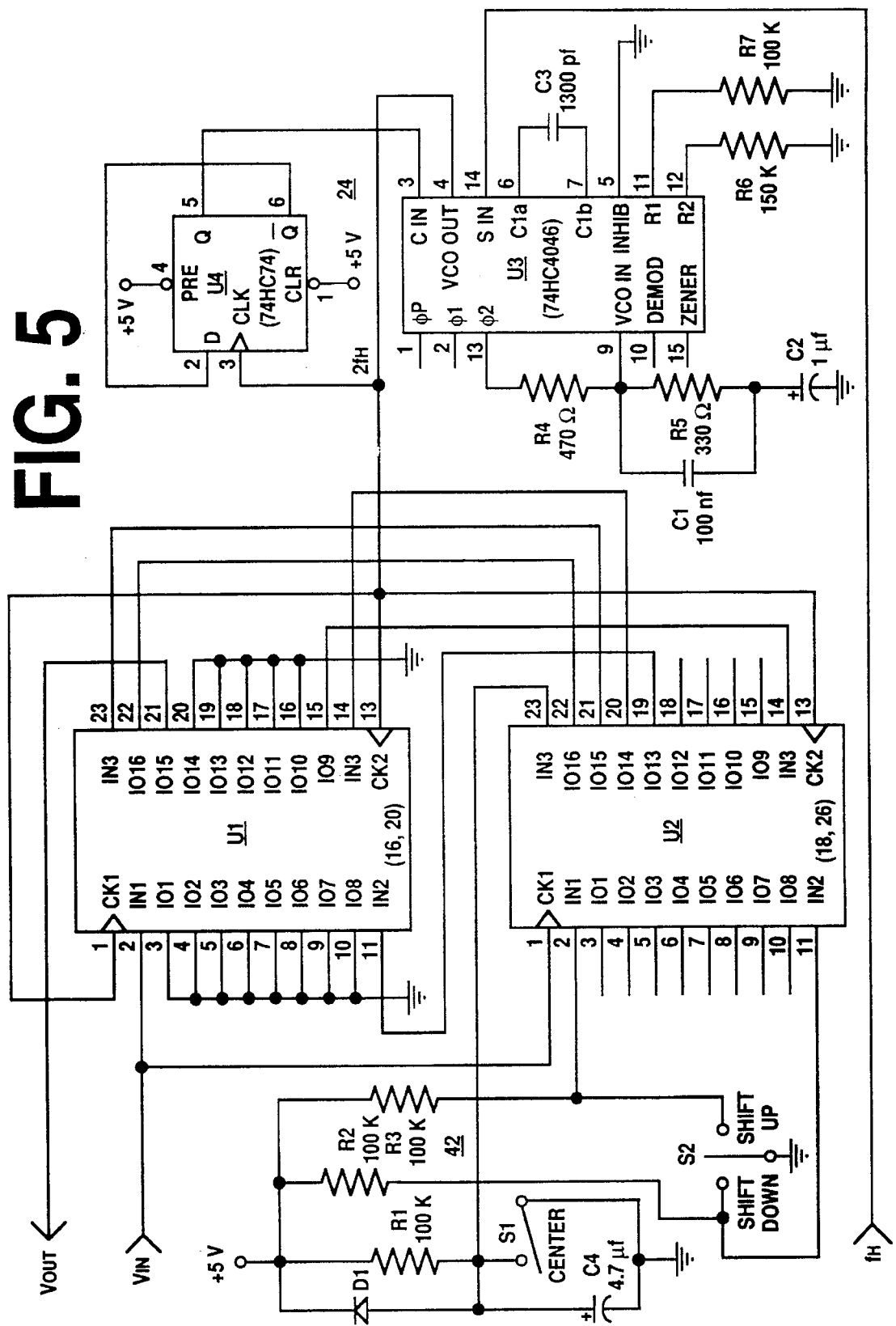
FIG. 5 is a schematic, largely in logic diagram form, of an embodiment of a vertical panning circuit according to an inventive arrangement.

FIG. 5 is a detailed circuit schematic, in logic diagram form, of blocks 14, 24, 26 and 42. A first programmable logic device U1 is used to embody counter 16 and decoder 20. A second programmable logic device U2 is used to embody counter 18 and counter 26. A phase locked loop device U3 and a D-type flip/flop U4, connected as a frequency divider, are used to embody the frequency multiplier 24. With reference to U3, pins 3 and 14 are inputs to a phase comparator. Pin 13 is an output of the phase comparator. A low pass filter is connected between pins 13 and 9. Pin 9 is the control input of a voltage controlled oscillator. Pin 4 is the output of the voltage controlled oscillator. A network of pull up resistors R1, R2 and R3 is used to embody the switch interface 42. Input signals are the $V_{IN}$ to signal, which may be a PAL standard vertical synchronizing frequency of 50 Hz, and the $f_H$ signal, which may be the PAL standard horizontal synchronizing frequency of 15,625 Hz. Signals $V_{IN}$ and $f_H$ may be the vertical and horizontal drive pulse signals respectively. The output is the phase delayed signal $V_{OUT}$. The $2f_H$ signal need not be generated if the $2f_H$ signal is otherwise available in the receiver.

After the power to the circuit is turned on, resistor R1 and capacitor C4 hold pin 23 of U2 at a logical LOW level fro an interval defined by their R-C time constant, which vertically centers the picture. Diode D1 assures that capacitor C4 is rapidly discharged when the power to the circuit is turned off.

The programmable logic devices U1 and U2 may each be embodied, for example, as industry type 5C060. The phase locked loop device U3 may be embodied, for example, as industry type 74HC4046. The D-type flip/flop U4 may be embodied, for example, as industry type 74HC74.

What is claimed is:

1. A vertical panning system, comprising:

means for supplying respective signals having a vertical synchronizing frequency, a horizontal synchronizing frequency and a multiple of said horizontal synchronizing frequency;

a horizontal display control circuit for a video display, responsive to said supplied horizontal synchronizing frequency signal for displaying a video signal by interlacing fields;

a plurality of digital counting means responsive to said supplied multiple horizontal synchronizing frequency signal, said supplied vertical synchronizing frequency signal and to a panning control signal;

means for decoding an output of one of said counting means and generating a second vertical synchronizing frequency signal delayed in phase relative to said supplied vertical synchronizing frequency signal by any one of a plurality of delays differing in increments corresponding in duration to horizontal half line intervals; and, a vertical display control circuit for said video display, responsive to said second vertical synchronizing frequency signal.

2. The system of claim 1, comprising means for presetting one of said digital counting means.

3. The system of claim 1, wherein said plurality of digital counting means comprises:

first digital counting means for generating a first clock output signal, clocked by said multiple horizontal frequency signal and enabled by said vertical frequency signal;

second digital counting means for generating a second clock output signal, clocked by said multiple horizontal frequency signal and set by said first output signal; and, third digital counting means, clocked by said vertical frequency signal, for generating a third clock output signal for presetting said second counter, said third clock output signal varying responsive to said panning control signal.

4. The system of claim 3, wherein said decoding means comprises digital decoding means responsive to said second clock output signal for generating said phase delayed vertical frequency synchronizing signal.

5. A vertical panning system, comprising:

means for supplying respective signals having a vertical synchronizing frequency, a horizontal synchronizing frequency and a multiple of said horizontal synchronizing frequency;

a horizontal display control circuit for a video display, responsive to said supplied horizontal synchronizing frequency signal for displaying a video signal by interlacing fields;

first digital counting means for generating a first clock output signal, clocked by said multiple horizontal frequency signal and enabled by said vertical frequency signal;

second digital counting means for generating a second clock output signal, clocked by said multiple horizontal frequency signal and set by said first output signal;

third digital counting means, clocked by said vertical frequency signal, for generating a third clock output signal for presetting said second counter, said third clock output signal varying responsive to is said panning control signal;

digital decoding means responsive to said second clock output signal for generating said phase delayed vertical frequency synchronizing signal; and, a vertical display control circuit for said video display, responsive to said second vertical synchronizing frequency signal.

6. The system of claim 1, wherein said horizontal synchronizing frequency corresponds to a horizontal synchronizing signal of an input video signal and said multiple of said horizontal synchronizing frequency is twice that of said horizontal synchronizing signal of said input video signal.

7. The system of claim 1, wherein said video display has a wide format display ratio.

8. A vertical panning system, comprising:

a source of respective signals having a vertical synchronizing frequency, a horizontal synchronizing frequency and a multiple of said horizontal synchronizing frequency;

a video display having a mode of operation in which fields of an input video signal are displayed in an interlaced format;

a horizontal display control circuit coupled to said video display and responsive to said supplied horizontal synchronizing frequency signal;

a digital phase delay circuit, having a plurality of digital counters responsive to said supplied multiple horizontal synchronizing frequency signal, said supplied vertical synchronizing frequency signal and to a panning control signal, and having a digital decoder for an output of one of said digital counter, said digital decoder generating a second vertical synchronizing frequency signal delayed in phase relative to said supplied vertical synchronizing frequency signal by any one of a plurality of delays differing in increments corresponding in duration to horizontal half line intervals; and, a vertical display control circuit coupled to said video display and responsive to said second vertical synchronizing frequency signal.

9. A vertical panning system, comprising:

a source of respective signals having a vertical synchronizing frequency, a horizontal synchronizing frequency and a multiple of said horizontal synchronizing frequency;

a video display having a mode of operation in which fields of an input video signal are displayed in an interlaced format;

a horizontal display control circuit coupled to said video display and responsive to said supplied horizontal synchronizing frequency signal;

a first counter, clocked by said multiple horizontal synchronizing signal, enabled by said vertical synchronizing signal and generating a first clock output signal;

a second counter, clocked by said multiple horizontal synchronizing signal, set by said first clock output signal to a starting count and generating a second clock output signal;

a third counter, clocked by said vertical synchronizing signal and generating a third clock output signal coupled to said second counter as said starting count, said third clock output signal varying responsive to vertical panning control signals;

a decoder coupled for receiving said second clock output signal and generating a decoded output signal as said phase delayed vertical frequency synchronizing signal; and, a vertical display control circuit coupled to said video display and responsive to said second vertical synchronizing frequency signal.

10. The system of claim 8, wherein said horizontal synchronizing frequency corresponds to a horizontal synchronizing signal of an input video signal and said multiple of said horizontal synchronizing frequency is twice that of said horizontal synchronizing signal of said input video signal.

11. The system of claim 8, wherein said video display has a wide format display ratio.

* * * * *